Aug. 24, 1954
N. F. ANDREWS
2,687,132
MECHANISM FOR AIR-CLEANING EARS AND
SHELLED CORN IN CORN HARVESTERS
Filed Dec. 4, 1950
3 Sheets-Sheet 1
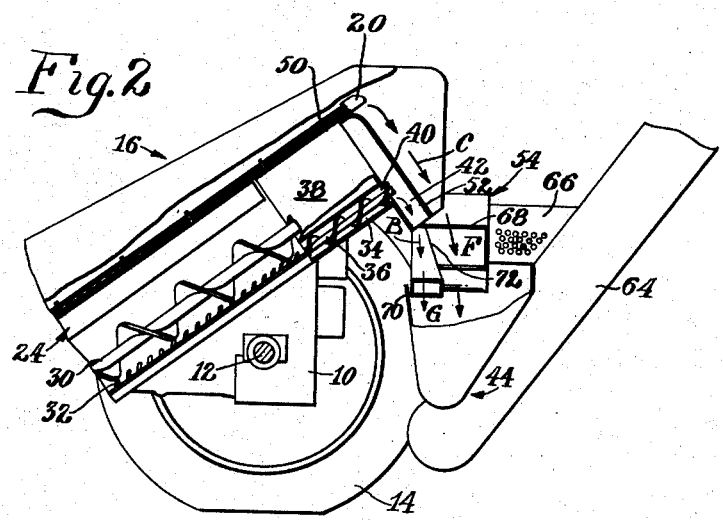
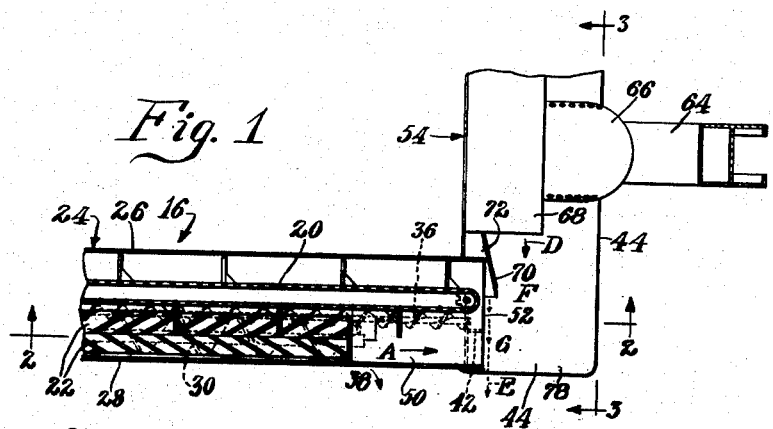
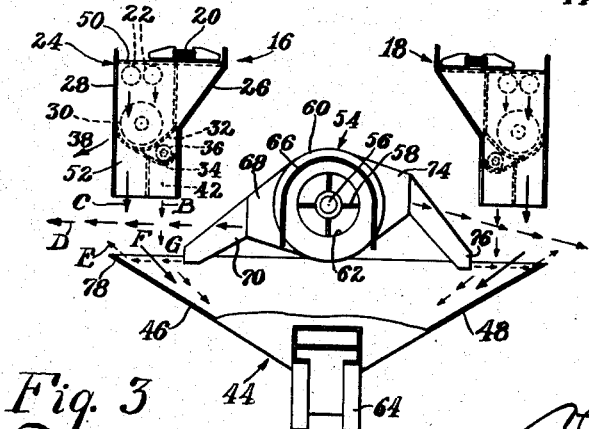
INVENTOR.
N. F. Andrews
BY
*Attorneys*

Aug. 24, 1954
N. F. ANDREWS
2,687,132
MECHANISM FOR AIR-CLEANING EARS AND
SHELLED CORN IN CORN HARVESTERS
Filed Dec. 4, 1950
3 Sheets-Sheet 2
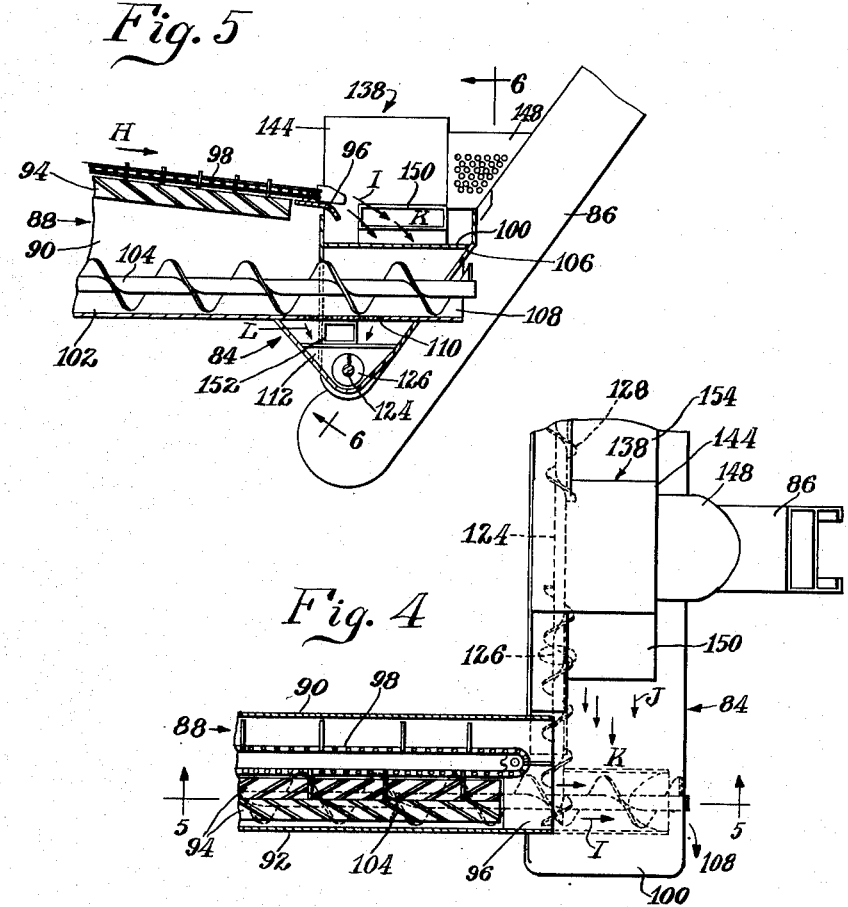
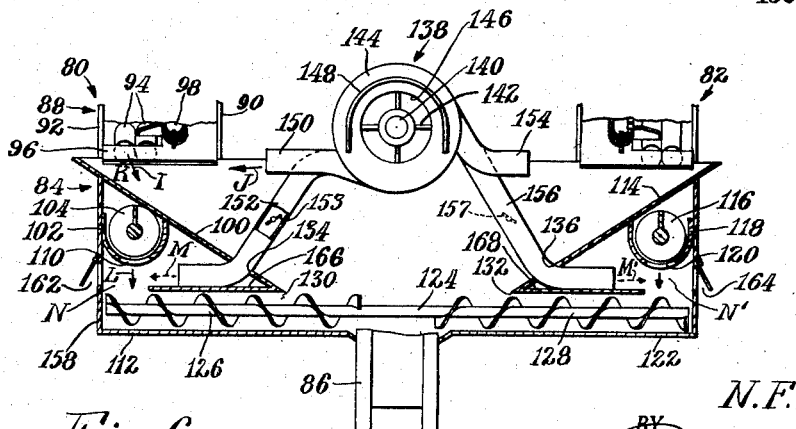
INVENTOR.
N. F. Andrews
BY
C. Parker and Shufknoth
Attorneys

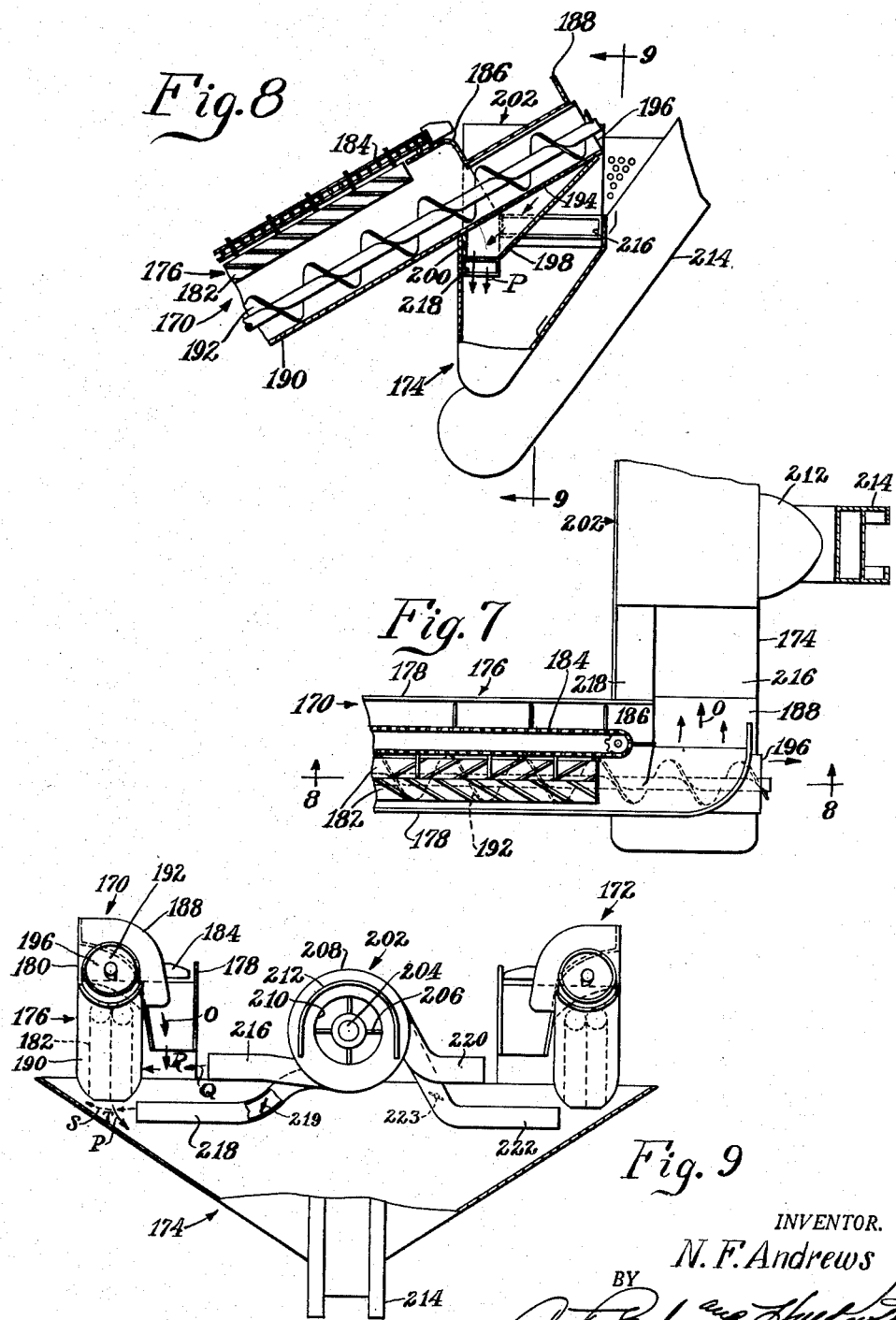

Patented Aug. 24, 1954

2,687,132

UNITED STATES PATENT OFFICE 2,687,132

MECHANISM FOR AIR-CLEANING EARS AND SHELLED CORN IN CORN HARVESTERS

Norman F. Andrews, Ankeny, Iowa, assignor to Deere Manufacturing Co., Dubuque, Iowa, a corporation of Iowa Application December 4, 1950, Serial No. 199,085

24 Claims. (Cl. 130—5)

This invention relates to material-handling mechanism and more particularly to conveying and handling structure for husking corn and for separating the ears out of the husks and the incidental shelled corn, together with means for recombining the ears and shelled corn.

Mechanisms of the general class referred to are found in most conventional corn harvesters. A corn harvester of this type normally comprises a mobile frame having means at the forward end for gathering corn from standing stalks. Some machines are provided with cutters for severing the stalks from the ground before the ears are moved from the stalks. In any event, the ears, when ultimately removed from the stalks, are conveyed to husking mechanism conventionally comprising one or more pairs of rotating rolls which grasp the husks and strip the husks from the ears. The husks are forced downwardly between the rolls and the ears are conveyed lengthwise of the rolls for ultimate deposit in a hopper or receptacle, whence the ears are taken by additional conveying means for transfer to a wagon or similar vehicle operated in conjunction with the corn harvester.

In machines of this type, fragments of husks or stalks will accompany the ears as they are being transferred from the husking mechanism to the hopper or receptacle and it is conventional to utilize air-generating means such as fans for directing a blast of air transversely to the stream of moving ears for the purpose of separating the lighter husk and stalk fragments and other trash from the ears.

It is also common in these machines that a substantial amount of shelled corn will occur as an incident to the husking operation. The shelled corn or kernels are passed downwardly through the husking rolls along with the husks and are subsequently screened out from the husks and ultimately conveyed to the same hopper or receptacle that receives the ears, the husks being discharged upon the ground. It has heretofore been common practice to direct the blast of air from the air-generating means through a zone in which the husked ears and the shelled-corn stream merge. However, because of the relatively light weight of the shelled corn, considerable shelled corn is lost, being blown out of the hopper or receptacle along with trash of commensurate weight. The amount of shelled corn thus lost may be considerable, depending upon the efficiency or inefficiency of the husking mechanism and other moving parts that tend to shell the kernels from the ears during the passage of the ears from the gathering mechanism to their ultimate point of deposit.

According to the present invention, air-current-generating means is provided with a pair of branches, one of relatively high capacity and the other of relatively low capacity, these branches being arranged so as to direct air currents in different zones. It is a concomitant feature to divide the ear and shelled-corn streams so that the former passes through the high-capacity air blast and the latter passes through the low-capacity air blast. The blasts of air are proportioned so as to drive the heavier trash fragments out of the ear stream and the lighter trash fragments out of the shelled-corn stream without the loss of either ears or shelled corn. It is an important object of the invention to provide material-handling means of the character indicated that may be readily adapted to corn harvesters of existing types. Further objects are to provide corn-handling mechanism that is of simplified design and easy to operate and maintain; that comprises relatively few moving parts; and that utilizes a single air-current-generating means having a plurality of branches for directing air currents of different capacities.

The foregoing and other important objects and desirable features inherent in and encompassed by the invention will become apparent as three preferred embodiments of the invention are disclosed in the following detailed description and accompanying sheets of drawings in which:

Figure 1 is a fragmentary plan view of one form of the invention.

Figure 2 is a longitudinal sectional view taken substantially on the line 2—2 of Figure 1 and showing the mechanism related to a mobile carrying structure such as the rear portion of an agricultural tractor.

Figure 3 is a rear elevational view, partly in section as viewed along the line 3—3 of Figure 1.

Figure 4 is a view similar to Figure 1 but showing a second form of the invention.

Figure 5 is a longitudinal sectional view taken on the line 5—5 of Figure 4.

Figure 6 is a rear transverse sectional view taken on the line 6—6 of Figure 5.

Figure 7 is a view corresponding to that shown in Figure 1 but showing a third form of the invention.

Figure 8 is a longitudinal sectional view taken substantially along the line 8—8 of Figure 7.

Figure 9 is a rear transverse sectional view as seen along the line 9—9 of Figure 8.

In general

Throughout the specification, the various parts will be referred to as having front and rear ends and upper and lower portions. These terms are used in the interests of clarity and brevity. These terms, like other positional and directional terms used herein, are therefore not to be construed as limiting the invention and the applicability thereof.

Figures 1, 2 and 3

In this form of the invention, the material-handling means has been illustrated as husking mechanism for a corn picker of the tractor-mounted type. A portion of a conventional agricultural tractor is shown at 10. The numeral 10 designates the tractor rear axle structure which has opposite laterally outwardly extending axles 12 (only one of which is shown) on each of which is mounted a relatively large traction wheel 14 (only one of which is shown).

The husking mechanism and supporting structure therefor are designated generally by the numeral 16. As illustrated in Figure 3, the mechanism may be associated with a corn harvester of the two-row type. Accordingly, a second husking mechanism is indicated generally by the numeral 18. Since the two are symmetrical and the parts thereof are symmetrically arranged, only the mechanism or unit 16 will be described.

This mechanism includes means in the form of an endless chain conveyor 20 movable in the direction of the arrow A in Figure 1 to convey ears of corn from forwardly located gathering mechanism (not shown) over husking means in the form of a pair of oppositely rotating husking rolls 22. The structure in this respect is generally conventional and familiarity with obvious details will be assumed.

The husking unit includes what may be termed a husking box 24 having inner and outer sidewalls 26 and 28. These lie respectively inside and outside the husking rolls 22 and also provide a trough along which the conveyor 20 moves (Figure 3). The trough is, of course, wide at the top to accommodate the conveyor 20.

As the ears of corn are moved lengthwise over the husking rolls 22, the husks on the ears are grasped by the rotating rolls 22 and are discharged downwardly into husk-receiving means including a conveyor in the form of a rearwardly moving auger 13. As an incident to the husking operation, a substantial quantity of kernels will be removed from the ears and will be discharged downwardly as shelled corn along with the husks to be received in the lower portion of the husk box 28 in which the husk auger 30 is carried. The bottom of the husk-receiving means is in the form of a perforated floor 32 through which the shelled corn is screened from the husks, the perforations in the floor being of an appropriate size so that the floor comprises means for separating the shelled corn from the husks. The shelled corn passes through the perforated floor 32 into a shelled-corn receiving means including a trough 34 that parallels the husk trough and in which rotates a longitudinally rearwardly moving shelled-corn auger 36.

As best seen in Figure 2, the husk auger 30 terminates considerably short of the rear or terminal end of the shelled-corn auger 36. Although the shelled-corn trough 34 is shown in section in Figure 2, it is to be understood that this trough is completely enclosed at its sides so that husks discharged at the rear of the husk auger at 38 cannot again be commingled with the shelled corn. The rear end of the shelled-corn trough 34 opens at 40 to a downwardly and rearwardly inclined chute 42 which provides shelled-corn-directing means for directing the shelled corn downwardly and rearwardly so that it passes by gravity in a relatively narrowly confined stream into a receptacle or hopper means designated generally by the numeral 44. As seen in Figure 3, the hopper has oppositely inwardly inclined walls 46 and 48, the former to receive ears and shelled corn from the husking mechanism 16 and the latter to receive ears and shelled corn from the husking mechanism 18. The path of gravitational passage of shelled corn is indicated in Figures 2 and 3 by the relatively light arrows B.

The rear ends of the husking rolls 22 terminate adjacent a continuing floor 50 over which the ears are moved rearwardly by the conveyor 20. This portion of the conveyor and the floor 50 comprise ear-discharge means for directing the ears downwardly along and over a rearwardly inclined ramp or chute 52 for discharge by gravity in an ear stream as shown by the relatively heavy arrows C in Figures 2 and 3. It will be seen from these two figures that the shelled corn-stream B and the ear stream C are spatially separated, both as viewed from the side (Figure 2) and as viewed from the rear (Figure 3). The arrangement of the shelled-corn-discharge means and the ear-discharge means in such manner enables the proper separate treatment of the shelled corn and ears so that the trash may be removed from both streams without loss of either ears or shelled corn, particularly the latter.

The air-current-generating means is designated generally by the numeral 54. This means preferably comprises a single fan having a rotating shaft 56 on which is mounted a single rotor 58, enclosed in a housing 60. The housing has a rear wall provided with a circular opening 62 for the intake of air.

The walls 46 and 48 of the hopper 44 converge downwardly to a common point and open into a rearwardly and upwardly extending conveyor in the form of a wagon elevator 64. A screen 66 in the form of an inverted U is connected between the rear wall of the fan housing 60 and the upper or forward sloping wall of the wagon elevator 64. This screen keeps the air intake clear of trash incidental to operation of the harvester.

The fan housing 60 is provided at one side thereof with a pair of air-current-directing branches 68 and 70. As shown, the branch 68 is considerably larger than the branch 70 and the latter is tapered, and therefore the former has a much higher capacity. As best seen in Figures 2 and 3, the outlet end of the branch 68 is above the level of the outlet end of the branch 70, thus discharging air or creating an air blast in a stream indicated by the arrows designated D. Because of the fore and aft separation of the branches 68 and 70, as seen at 72 in Figure 2, the outlet ends of the branches are not only at a different level but are separated from front to rear, generally in accordance with the front-to-rear separation of the shelled corn-stream B and the ear stream C. Therefore, as the ears pass downwardly into the hopper 44 through what may be termed an ear-discharge zone F, the ears are subjected to the blast created by the fan 54 and directed by the branch 68. Stated otherwise, the zone F is substantially at the intersection of the ear stream C and the air blast D from the large branch 68.

A shelled-corn zone G occurs substantially at the intersection of the shelled-corn stream B and the lighter air blast E from the smaller branch 70 of the fan (Figures 1 and 3 particularly).

Inasmuch as a certain amount of trash is bound to accumulate during the husking operation and will not be separated through the husking rolls, this trash will accompany the ears and shelled corn in their separate streams to ultimate commingling in the hopper 44. However, since the two streams pass through separate zones, the air blasts of different intensities may be separately applied, thus avoiding the blowing out of shelled corn along with trash. Therefore, all shelled corn that is ultimately delivered toward the hopper 44 will reach the bottom of the hopper to be conveyed by the wagon elevator 64. Stated otherwise, the shelled corn is delivered in such manner as to by-pass the substantially heavy blast of air normally required to separate trash from the ears. In addition, this shelled corn is subjected to a lighter air cleaning treatment for the purpose of removing trash therefrom.

The symmetrical construction and relation of the component of the right-hand husking mechanism 18 to a high-capacity branch 74 and a low-capacity branch 76 connected to the fan 54 will be obvious without description in detail.

The air blast E from the smaller branch 70 is further diminished because it is directed against the upper edge at 78 of the hopper wall 46, causing the blast to impinge on this wall portion and thus to afford an obstacle to the escape of lighter kernels that may tend to be blown outwardly by even the small blast.

*Figures 4, 5 and 6*

The material-handling means shown in this embodiment of the invention includes the basic principles of the embodiment just described, in addition to variations in the form of refinements and improvements. The means includes a left-hand husking unit 80 and a right-hand husking unit 82, the arrangement being such that the mechanism may be adapted to the corn harvester of the two-row type. This may be mounted on a tractor (not shown) or any other appropriate mobile frame (likewise not shown). Both husking mechanisms or units discharge at their rear ends to a common hopper or receptacle means designated generally by the numeral 84. A wagon elevator 86 leads from the central portion of the hopper means and in this respect is similar to the wagon elevator 64 of the embodiment described in connection with Figures 1, 2 and 3.

Since the husking mechanisms 80 and 82 are symmetrical and function in identical manners, only the left-hand mechanism will be described in detail.

This mechanism or unit comprises a husking box 88 having inner and outer side walls 90 and 92 between the upper portions of which is mounted a pair of rotatable husking rolls 94. Ear-discharge means in the form of a plate 96 is mounted at the rear ends of the husking rolls 94 and a conveyor in the form of an endless chain 98, moving in the direction of the arrow H (Figure 5), moves ears of corn rearwardly over the husking rolls to be first husked and then discharged at 96 by gravity into the hopper 84. The stream of gravitational discharge of ears by the means just described is represented generally by the heavy arrows identified by the letter I.

The hopper 84 is constructed with a partition wall 100 which slopes inwardly and downwardly toward the center of the hopper. Husked ears discharged through the stream I pass downwardly over the upper surface of this wall to the wagon elevator 86.

Husks removed from the ears while the ears pass over the husking rolls 94 are discharged downwardly into receiving means in the form of a trough 102 formed at the bottom of the husk box 88. Kernels removed from the ears incident to the husking operation likewise pass downwardly between the rolls as shelled corn to commingle with the husks in the trough 102. This trough carries rearwardly moving means in the form of an auger 104 which opens through a rear wall 106 of the hopper 84 to provide husk-discharge means 108 via which the husks are discarded externally of the hopper, to fall upon the ground. A rear portion of the bottom of the trough 102 is perforated at one end to provide for separating the shelled corn from the husks, the perforated portion providing a screen through which the shelled corn can pass to a second receiving means in the form of a trough 112 disposed transversely relative to the trough 102 and consequently transversely relative to the husking rolls 94.

The opposite side of the hopper 84 is provided with a partition wall 114 over which ears move from the husking mechanism 82. This husking mechanism includes a rearwardly moving auger 116 for moving husks and shelled corn longitudinally through a trough 118, the material passing over a perforated bottom portion 120 through which the shelled corn is screened to drop into a transverse shelled-corn trough 122 in transverse alignment with the shelled-corn trough 112. In these troughs are respective means for moving the shelled corn inwardly for commingling with the husked ears at the center of the hopper 84, whence both types of material are moved by the wagon elevator 86. The means for moving the shelled corn here comprises a single transverse rotatable shaft 124 on which is mounted a pair of oppositely wound augers 126 and 128. The partition walls 100 and 114 are open respectively at 130 and 132 so that the augers 126 and 128 may extend therethrough. These partition walls are further provided respectively with openings 134 and 136, for the purpose to presently appear.

There is associated with the material-handling means just described, means for generating air-currents. This means is designated generally by the numeral 138 and comprises a single fan having a rotatable shaft 140 and a single rotor 142 enclosed within a fan housing 144. The rear wall of the housing has a circular air intake opening 146 screened by a perforated shield 148 in the form of an inverted U interposed between the fan housing 144 and the wagon elevator 86.

The fan housing is provided at the left-hand side thereof with a pair of air-current directing branches 150 and 152. The branch 150 is substantially larger than the branch 152 and the latter has adjustable means in the form of a damper 153 which provides a restriction therein, whereby the branch 150 has a considerably higher capacity than the relatively smaller branch 152. These branches, as best seen in Figures 5 and 6, are vertically separated to be disposed at different horizontal levels. The branch 150 is so arranged as to direct the relatively heavy or intense blast of air laterally outwardly as indicated by the arrows J so that this air blast substantially intersects the ear stream I in what may be termed an ear-discharge zone K. Since the air blast directed by the branch 150 is relatively heavy, relatively heavy particles or fragments of trash discharged at 96 with the ears will be blown over the side of the hopper 84. A similar high-capacity branch 154 is provided at the other side of the fan housing 144 to air-clean ears discharged to the hopper 84 by the right-hand husking mechanism 82. The ears at both sides of the hopper pass downwardly respectively over the inclined partition walls 100 and 114 without any interference therewith by the low-capacity branch 152 and a second low-capacity branch 156, these branches extending downwardly and outwardly and respectively through the openings 134 and 136 in the inclined walls 100 and 114. The branch 156 has a damper 157.

Because the shelled corn discharged through the perforated bottom 110 of the husk- and shelled-corn trough 102 passes downwardly to the trough 112, it may be said to move by gravity in a shelled-corn stream indicated by the arrows L in Figures 5 and 6. A similar shelled-corn stream L' will be present at the right hand side of the machine. It will be noticed that the spatial separation of the ear stream I and the shelled-corn stream L is further accentuated by the partition wall 100 so that the two streams are also structurally separated. The branch 152 enters through the opening 134 in the partition wall 100 as aforesaid, and is then directed so as to discharge a relatively low-intensity blast of air as indicated by the dotted arrow M at the left-hand side of Figure 6. A similar result will obtain at the right-hand side of the mechanism, as indicated by the arrow M'. The shelled-corn stream L and the low-intensity air stream M may be said to intersect in a shelled-corn zone N which, as stated above, is structurally spatially separated from the ear-discharge zone K. The lighter blast of air from the branch 152 is capable of separating light trash from the shelled corn without blowing the shelled corn out of the hopper. A similar shelled-corn discharge zone N' will be provided at the other side of the machine.

The left-hand side of the hopper 84 is completed by an outer longitudinal upright wall 158, therefore establishing the hopper 84 as a two-compartment means, one of which receives the ears and the other of which receives (via the trough 112) the shelled corn. A similar wall 160 is provided at the other side of the hopper. These walls are provided respectively with baffled openings 162 and 164 respectively in alignment with the outlet ends of the low-capacity air branches 152 and 156.

The shelled-corn troughs 112 and 122 are further defined respectively by horizontal separating walls 166 and 168.

*Figures 7, 8 and 9*

In this form of the invention, there are again right- and left-hand husking units which discharge into a common hopper means or receptacle. The left-hand unit is designated generally by the numeral 170, the right-hand unit by the numeral 172 and the hopper by the numeral 174. Again, emphasis in the description in detail will be on the left-hand unit.

This unit comprises a husking box 176 having inner and outer walls 178 and 180 providing a trough lengthwise of the upper portions of which are carried a pair of rotatable husking rolls 182 over which ears of corn to be husked are moved by a conveyor in the form of an endless chain 184. Means in the form of a plate or floor 186 is provided at the rear end of the rolls to establish ear-discharge means over which husked ears may be discharged as they are moved from the husking rolls 182 by the conveyor chain 184.

As the ears leave the discharge means 186, they are directed laterally and inwardly by means of a chute 188, whence they pass downwardly in an ear stream designated by the arrows O in Figure 9, passing by gravity into the hopper or receptacle means 174.

Husks and shelled corn removed from the ears during the husking operation pass downwardly between the husking rolls 182 and fall into receiving means in the form of a trough 190, formed at the bottom of the husk box 176. The husks and shelled corn are moved upwardly and rearwardly by an auger 192, which may, of course, be replaced by any equivalent means. The upper or rear portion of the trough 192 is provided with a perforated bottom 194 which provides means for separating the shelled corn from the husks, the rear end of the trough 190 being open at 196 so that the husks may be discharged or discarded externally of the hopper 174. The shelled corn passing through the perforated bottom 194 moves downwardly by gravity as indicated by the arrows P in Figures 8 and 9. The floor of the chute 88 thus structurally and spatially separates the ear stream O from the shelled-corn stream P, the structural separation being accomplished by a funnel-like structure including walls 198 and 200 shaped to confine the shelled-corn stream to the area or zone indicated.

Air-current-generating means designated generally by the numeral 202 is situated over the hopper 174 intermediate the husking units 170 and 172. This means comprises a single fan having a fan shaft 204 and a single rotor 206 enclosed in a fan housing 208. The rear wall of the housing has an air intake opening 210 screened by an inverted U-shaped screen 212 positioned between the rear wall of the fan housing and the front wall of a rearwardly and upwardly extending wagon elevator 214 joined to the hopper 174 at its lower central portion.

The fan housing is provided at its left hand side with a pair of air outlet branches 216 and 218, the former being substantially larger than the latter and the latter having adjustable damper or restriction means 219, whereby the branch 216 has a substantially larger capacity. The branch 216 is at a somewhat higher level than the smaller branch 218 and is arranged to direct a blast of air outwardly along a path indicated by the arrows Q in Figure 9. The blast of air intersects the ear stream O in what may be termed an ear-transfer zone R, and the air blast at Q acts to air-clean the ear stream, thus blowing particles of trash and other fragments outwardly as the ears pass by gravity into the hopper 174.

The lower-capacity branch 218 is disposed at a lower level and extends laterally outwardly to a greater extent than does the larger branch 216. The outlet end of this branch, as best seen in Figures 8 and 9, is positioned to direct a relatively light blast of air along a path indicated by dotted arrows S in Figure 9. The intersection of the light air blast S and the shelled-corn stream P is in what may be termed a shelled-corn transfer zone T.

As in the modification previously described, the ear stream and the shelled-corn stream are spatially separated and are subject to air blasts of different intensities commensurate with the size of the material being moved, therefore avoiding subjecting the lighter material to a heavier blast of air and consequently avoiding the loss of shelled corn along with trash fragments. After the two streams pass their respective air-directing branches, they are commingled in the hopper 174 for common transfer by the wagon elevator 214.

The opposite side of the fan 202 is provided with a pair of outlet or air-directing branches 220 and 222, the former being a large branch and the latter a small branch having a damper 223. These branches direct air currents on streams of ears and shelled corn discharged by the right-hand husking unit 172 in a manner similar to that previously described.

*Summary*

In all forms of the invention illustrated, there is the common principle of keeping lighter and heavier materials separate for the purpose of subjecting these materials separately to air currents or air blasts of different intensities, thereby avoiding the inadvertent separation of material that is desired to be retained. In many cases, the shelled corn will be considerably lighter than trash fragments discharged with ears, and the subjecting of the commingled stream of ears and shelled corn to a relatively heavy blast of air results in the loss of a substantial amount of shelled corn. According to the present invention, the shelled corn is first screened by passage with the husks through the husk-receiving means and over the perforated screen, whereupon the shelled corn is additionally separated from large fragments of husks, and all that remains mixed with the shelled corn are finer fragments of trash such as dust and the like that can be readily separated from the shelled corn by the relatively light air blast. It is also a common feature of all forms of the invention that, although the ears and shelled corn are initially separated, they are returned and mixed or commingled for ultimate discharge by a single conveyor, which is desirable. At the same time, the separation is maintained so that the two materials are separately subjected to the two different air blasts, as stated above.

Various other features and advantages of the invention not specifically enumerated herein will undoubtedly occur to those versed in the art, as likewise will numerous modifications and alterations in the preferred embodiments of the invention illustrated, all of which may be achieved without parting from the spirit and scope of the invention as defined in the appended claims.

What is claimed is:

1. In corn-husking mechanism wherein ears of corn are husked and discharged to a receptacle means and husks and shelled corn removed from the ears as an incident to the husking operation are separated from each other and the shelled corn discharged to said receptacle means and the husks discharged externally of said receptacle means, the improvement residing in mechanism for air-cleaning the ears and shelled corn, comprising: means for directing the ears from the husking mechanism to the receptacle means through an ear-transfer zone; means for directing the shelled corn from the husking mechanism to the receptacle means through a shelled-corn-transfer zone spatially separate from the ear-transfer zone; and air-current-generating means having a pair of air-current-directing elements, one of relatively low capacity positioned to act in the shelled-corn-zone, and the other of relatively higher capacity positioned and confined to act in the ear-transfer zone.

2. The invention defined in claim 1, further characterized in that: the ear-directing means is at a relatively high level and is effective to cause ears to move downwardly through the ear-transfer zone to the receptacle means; the shelled-corn-directing means is at a relatively lower level and is effective to cause the shelled corn to move downwardly through the shelled-corn-transfer zone to the receptacle means; and the high- and low-capacity air-current directing elements are respectively at relatively high and low levels.

3. The invention defined in claim 1, further characterized in that: the air-current directing means comprises a single fan housing containing a fan rotor therein and the air-current-directing elements consist of a pair of air-outlet branches leading from the housing.

4. The invention defined in claim 1, further characterized in that: the ear-directing means and the shelled-corn-directing means are positioned side-by-side and structurally separate so as to respectively direct ears and shelled corn in spaced apart parallel streams respectively through the ear-transfer and shelled-corn-transfer zones; and the air-current-directing elements are spaced apart on the order of the spacing of said parallel streams.

5. The invention defined in claim 4, further characterized in that: the structural separation of the ear-directing means and the shelled-corn-directing means is effected by a pair of parallel inclined chutes offset vertically and discharging by gravity into the receptacle means, each chute having a terminal discharge end, and the discharge end of one chute terminating short of that of the other to effect the gravitational discharge of ears and shelled corn in spaced apart substantially vertical streams through their respective zones.

6. The invention defined in claim 1, further characterized in that: the ear-directing means and the shelled-corn-directing means comprise a pair of structurally separate chutes leading to the receptacle means and having discharge ends offset to effect gravitational transfer of ears and shelled corn in separate streams respectively through the ear-transfer and shelled-corn-transfer zones; and the air-current-directing elements are positioned to act respectively on upper portions of said streams.

7. In corn-husking mechanism wherein ears of corn are husked and discharged to a walled receptacle means and husks and shelled corn removed from the ears as an incident to the husking operation are separated from each other and the shelled corn discharged to said receptacle means and the husks discharged outside said receptacle means, the improvement residing in mechanism for air-cleaning the ears and shelled corn, comprising: air-current-generating means having a pair of separate air-current-directing branches, one of relatively high capacity and the other of relatively lower capacity positioned in spaced apart relationship intermediate the husking mechanism and the receptacle means; means for effecting the transfer of ears from the husking mechanism to the receptacle means in a stream exposed to the high-capacity branch of the air-current-generating means; and separate means for effecting the transfer of shelled corn from the husking mechanism to the receptacle means in a separate stream exposed only to the low-capacity branch of said air-current-generating means.

8. The invention defined in claim 7, further characterized in that: a partition wall is provided in the receptacle means and said wall has an opening therein; the high-capacity branch of the air-current-generating means is disposed at a first side of said wall and the low-capacity branch extends through said opening to a second side of the wall; the ear-transfer means and the shelled-corn-transfer means are arranged to direct the ear stream and the shelled-corn stream respectively to the first and second sides of the wall so that the wall separates said streams and so that the ear stream and the shelled-corn stream are respectively exposed to the high- and low-capacity branches of the air-current-generating means; means is provided at the second side of the wall for receiving shelled corn from the shelled-corn stream after the shelled corn has been exposed to the low-capacity branch; and means is provided for moving the shelled corn from said receiving means to the receptacle means at said first side of the wall.

9. The invention defined in claim 8, further characterized in that: the shelled-corn-transfer means comprises a conveyor at the second side of the wall and above the level of the low-capacity branch and having a perforated bottom through which shelled corn may drop past the low-capacity branch and into the receiving means; and the means for moving the shelled corn from the second side to the first side of the wall comprises a cross conveyor communicating the receiving means and the receptacle means.

10. The invention defined in claim 7, further characterized in that: the ear-transfer means comprises an inclined wall having upper and lower sides and a terminal end and down which upper side ears move by gravity to said terminal end, and said high-capacity branch is disposed at the upper side of said wall ahead of the terminal end thereof to act on and to air-clean ears moving thereover; said wall having an opening therethrough and the low-capacity branch extending through said opening at the lower side of said wall; and the shelled-corn-transfer means comprises a conveyor for delivering shelled corn to the lower side of the wall and past the low-capacity branch for air-cleaning thereof, and a second conveyor for delivering cleaned shelled corn to the terminal end of the inclined wall for commingling with the cleaned ears.

11. The invention defined in claim 7, further characterized in that: the ear-transfer means comprises an inclined wall having upper and lower sides and a terminal end and down which upper side ears move by gravity to said terminal end, and said high-capacity branch is disposed at the upper side of said wall ahead of the terminal end thereof to act on and to air-clean ears moving thereover; the low-capacity branch by-passes the wall and extends at the lower side of said wall; and the shelled-corn-transfer means comprises a conveyor for delivering shelled corn to the lower side of the wall and past the low-capacity branch for air-cleaning thereof, and a second conveyor for delivering cleaned shelled corn to the terminal end of the inclined wall for commingling with the cleaned ears.

12. The invention defined in claim 7, further characterized in that: the air-current-generating means comprises a single fan housing containing a fan rotor, and the two branches lead from said housing.

13. The invention defined in claim 7, further characterized in that: the high-capacity and low-capacity branches of the air-current generating means are respectively at relatively high and lower levels; and the ear-transfer and shelled-corn-transfer means discharge ears and shelled corn respectively at relatively high and lower levels for gravitational movement in separate streams respectively past said high- and low-capacity branches.

14. Corn-handling mechanism, comprising: husking means having inlet and outlet ends and over which ears of corn are moved toward said outlet end for the removal of husks from such ears, said mechanism being operative to discharge downwardly such husks and shelled corn resulting from the husking operation; hopper means at the outlet end of the husking mechanism and having a generally upright wall beneath said outlet end; means at said outlet end for directing ears in an exposed, defined stream over said wall and into the hopper means; means below the husking mechanism and ahead of said wall for receiving husks and shelled corn from said mechanism and including a conveyor for moving husks and shelled corn toward the hopper means, said conveyor having a husk outlet for discarding husks exteriorly of said hopper means and further having a perforated bottom for discharging shelled corn separate from the husks; means associated with the aforesaid conveyor and by-passing said hopper wall for receiving separated shelled corn from said perforated bottom and for delivering such shelled corn to said hopper means in an exposed, defined stream separate from the aforesaid ear stream; and air-current-generating means having a pair of air-current branches inwardly of said wall, one branch having a relatively high capacity and positioned to act solely on the ear stream in a direction transverse to said ear stream, and the other branch having a relatively lower capacity and positioned in spaced apart relation to the high-capacity branch to act on the shelled-corn stream in a direction transverse to said shelled corn stream.

15. The invention defined in claim 14, further characterized in that: both the ear-directing means and the means for delivering shelled corn to the hopper means discharge over the hopper wall in spaced apart relationship so that the ears and shelled corn are directed to the hopper means by gravity and in parallel, separate streams respectively past the high- and low-capacity branches of the air-current generating means.

16. The invention defined in claim 14, further characterized in that: the conveyor for moving husks and shelled corn toward the receptacle means extends inwardly of the hopper means, the perforated bottom thereof is within the hopper means, and the husk outlet is disposed beyond the hopper means to discharge husks outside said hopper means.

17. The invention defined in claim 14, further characterized in that: the hopper means has a partition wall normal to the upright wall and separating the hopper means into first and second parts; the ear-directing means is arranged to direct the ear stream into the first part and the high-capacity branch of the air-currentgenerating means is confined to said first part; the conveyor for moving husks toward the hopper means enters said second part of the hopper means and is constructed and arranged so that the perforated bottom discharges shelled corn within said second part and the husk outlet discharges husks outside the hopper means; the low-capacity branch extends into the second part to act on shelled corn passing through said perforated bottom; and conveyor means is provided for carrying air-cleaned shelled corn from the second part to the first part of the hopper means.

18. The invention defined in claim 14, further characterized in that: the hopper means has a downwardly sloping wall dividing the hopper means into first and second parts; the ear-directing means is arranged to direct the husked-ear stream downwardly over said wall into the first part of said hopper means; the high-capacity branch is positioned and confined within the first part to act on an upper portion of said ear stream; said sloping wall has an opening therein and the low-capacity branch extends through said opening and into the second part of the hopper means; the conveyor for moving husks and shelled corn enters said second part and the perforated bottom is positioned to drop shelled corn past the air-currents directed by said low-capacity branch, and the husk outlet is arranged to discard husks outside the hopper means; said sloping wall has a second opening therein below the level of said perforated bottom; and an air-cleaned-shelled-corn conveyor extends from below said perforated bottom, through said second opening in the sloping wall and communicates with the first part of the hopper below the high-capacity branch.

19. The invention defined in claim 18, further characterized in that: both conveyors are auger conveyors and arranged at right angles to each other.

20. In a corn-handling machine: corn-husking mechanism having inlet and outlet ends and means for moving ears of corn over said mechanism from the inlet end to the outlet end thereof; receptacle means proximate to the outlet end of the corn-husking mechanism for receiving husked ears from said mechanism; ear-discharge means intermediate the outlet end of the husking mechanism and the receptacle means for directing husked ears to said receptacle means through an ear-discharge zone; means associated with the husking mechanism ahead of the receptacle means for receiving husks and shelled corn from said mechanism as an incident to the husking operation; means in the husk- and shelled-corn-receiving means for separating shelled corn from husks; means communicating with the separating means for directing husks outside the receptacle means; second means communicating with the separating means for moving shelled corn toward the receptacle means, and including shelled-corn-discharge means for directing the shelled corn to the receptacle means in a shelled-corn-discharge zone spatially separate from the ear-discharge zone; and air-current generating means having a pair of air-current-directing means, one of relatively low capacity positioned to act in the shelled-corn-discharge zone, and the other of relatively higher capacity positioned and confined to act in the ear-discharge zone.

21. Corn-handling mechanism, comprising: husking means for removing husks from corn ears and having a discharge end for discharging husked ears; means below the husking means into which husks and incidental shelled corn drops from the husking means; hopper means at the discharge end of the husking means and having a partition dividing said hopper means into first and second parts; means for directing husked ears from the discharge end of the husking means exclusively to the first hopper part; corn-collecting means at the bottom of the hopper means and in communication with said first hopper part to receive husked ears therefrom; conveyor means for moving husks and shelled corn from the aforesaid husk- and shelled-corn receiving means toward the second hopper part, said conveyor means including elements for separating the shelled corn from the husks and elements for discharging the separated shelled corn within said second hopper part and for discarding separated husks outside said second hopper part; and a shelled-corn conveyor for receiving shelled corn from the separating and discharging elements and for moving such shelled corn from within said second part to the aforesaid corn-collecting means for commingling of such shelled corn with the husked ears.

22. Corn-handling mechanism, comprising: elongated husking means for removing husks from corn ears and having a discharge end for discharging husked ears; means below the husking means into which husks and incidental shelled corn drops from the husking means; hopper means at the discharge end of the husking means and having a partition dividing said hopper means into first and second parts separated in a direction transverse to the length of the husking means; means for directing husked ears from the discharge end of the husking means exclusively to the first hopper part; corn-collecting means at the bottom of the hopper means and in communication with said first hopper part to receive husked ears therefrom; conveyor means running lengthwise as respects the husking means and spaced laterally from said corn-collecting means for moving husks and shelled corn from the aforesaid husk- and shelled-corn receiving means toward the second hopper part, said conveyor means including elements for separating the shelled corn from the husks and elements for discharging the separated shelled corn within said second hopper part and for discarding separated husks outside said second hopper part; and a laterally extending shelled-corn conveyor for receiving shelled corn from the separating and discharging elements and for moving such shelled corn from within said second part to the aforesaid corn-collecting means for commingling of such shelled corn with the husked ears.

23. In a corn-handling machine: corn-husking mechanism having inlet and outlet ends and means for moving ears of corn over said mechanism from the inlet end to the outlet end thereof; receptacle means proximate to the outlet end of the corn-husking mechanism for receiving husked ears from said mechanism; ear-discharge means intermediate the outlet end of the husking mechanism and the receptacle means for directing husked ears to said receptacle means through an ear-discharge zone; air-current-generating means having a branch for directing air through the ear-discharge zone to air-clean ears passing through said zone; means associated with the husking mechanism ahead of the receptacle means for receiving husks and shelled corn from said mechanism as an incident to the husking operation; means in the husk- and shelled-corn-receiving means for separating shelled corn from husks; means communicating with the separating means for directing husks outside the receptacle means; and means communicating with the separating means for receiving shelled corn and for moving such shelled corn to the receptacle means in a stream by-passing the ear-discharge zone.

24. The invention defined in claim 1, further characterized in that: the low-capacity element has adjustable means therein to vary its capacity.

References Cited in the file of this patent

UNITED STATES PATENTS

| Number | Name | Date |
|---|---|---|
| Re. 1,545 | Trimmer | Sept. 29, 1863 |
| 210,333 | Kibler | Nov. 26, 1878 |
| 450,855 | Wottring | Apr. 21, 1891 |
| 718,902 | Berry | Jan. 20, 1903 |
| 1,580,351 | Van Nortwick | Apr. 13, 1926 |
| 1,596,830 | Haase | Aug. 17, 1926 |
| 2,080,717 | Hitchcock | May 18, 1937 |
| 2,222,282 | Court | Nov. 19, 1940 |
| 2,298,198 | Coultas et al. | Oct. 6, 1942 |
| 2,337,592 | Coultas et al. | Dec. 28, 1943 |
| 2,347,871 | Andrews et al. | May 2, 1944 |
| 2,420,543 | Johnson | May 13, 1947 |
| 2,443,039 | Johnson | June 8, 1948 |
| 2,492,897 | Siefken | Dec. 27, 1949 |
| 2,549,999 | Andrews | Apr. 24, 1951 |
| 2,577,349 | Mitchell | Dec. 4, 1951 |